H. P. WHITE.
LUBRICATING MATERIAL AND METHOD OF MANUFACTURING THE SAME.
APPLICATION FILED APR. 15, 1911.
1,002,349.
Patented Sept. 5, 1911.
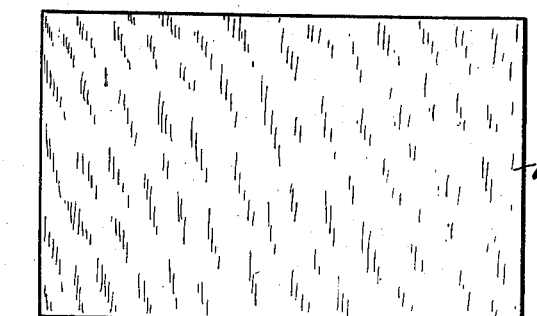
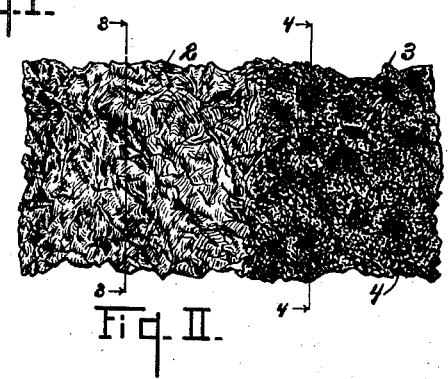
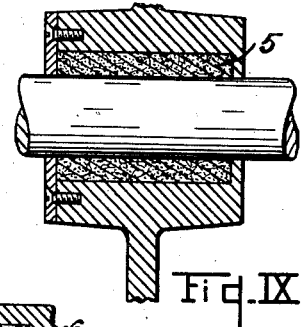
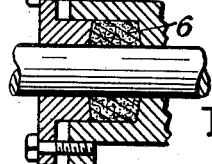
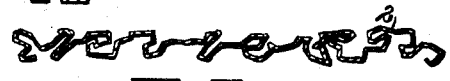
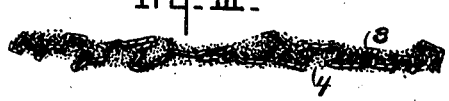
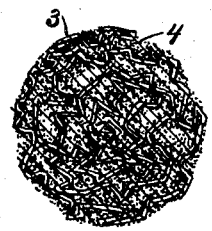
Witnesses
Margaret Shaw.
Luella Greenfield
Inventor
Henry P. White
By Chappell Earl
Attorneys

UNITED STATES PATENT OFFICE.

HENRY P. WHITE, OF KALAMAZOO, MICHIGAN.

LUBRICATING MATERIAL AND METHOD OF MANUFACTURING THE SAME.

1,002,349.  Specification of Letters Patent.  Patented Sept. 5, 1911.

Application filed April 15, 1911. Serial No. 621,283.

*To all whom it may concern:*

Be it known that I, HENRY P. WHITE, a citizen of the United States, residing at Kalamazoo, Michigan, have invented certain new and useful Improvements in Lubricating Materials and Methods of Manufacturing the Same, of which the following is a specification.

This invention relates to improvements in lubricating materials and methods of manufacturing the same.

The object of the invention is to provide an efficient retaining means for a graphite, or other solid lubricant material, such as talc or mica in the form of powder or a flaky powder, to preserve an efficient bearing surface which can be readily inserted in place, as for the packing of a piston rod or valve stem, or the lining of a journal bearing.

A further object of my invention is to provide an improved method of manufacturing such a lubricating material.

Objects pertaining to details and economies will definitely appear from the description to follow.

I accomplish the objects of my invention by the devices and means described in the following specification.

The invention is clearly defined and pointed out in the claims.

The means and methods adopted by me for carrying out my invention are, so far as practical, illustrated in the accompanying drawing, forming a part of this specification, in which,—

Figure I illustrates a plain sheet of metal foil. Fig. II is a sheet of metal foil after it has been crumpled according to my method, the left-hand end portion of the same having been coated with oil, and the right-hand end portion illustrated as coated with graphite or other solid lubricant in addition. Figs. III and IV are cross sectional views of the structure appearing in Fig. II, taken on lines 3—3 and 4—4; respectively, Fig. III indicating the oiled part and Fig. IV the cross section of the part loaded with graphite or solid lubricant in addition thereto. Fig. V illustrates the crumpled sheet rolled into a scroll. Fig. VI is an enlarged detail cross-sectional view of the structure appearing in Fig. V. Fig. VII shows the structure appearing in Fig. V after it has been somewhat compressed into bar form. Fig. VIII illustrates a cross section of the bar seen in Fig. VII, illustrating the distribution of the metal and lubricating material. Fig. IX is a detail view of a journal bearing lined with the packing material, the particular example being the bearing in a trolley wheel. Fig. X is a view of my improved packing as a gasket in a stuffing box for a piston rod.

In the drawing, the sectional views are taken looking in the direction of the little arrows at the ends of the section lines, and similar numerals of reference refer to similar parts throughout the several views.

Referring to the numbered parts of the drawing, 1 illustrates a flat, rectangular sheet of metal foil, of smooth and even texture. Fig. II illustrates the sheet after it has been crumpled. The surface is thus rendered irregular, the dimension of the sheet being reduced about the proportion I have illustrated, the same being taken from photographs to show the comparative size and reduction. When the sheet is in the flat, as seen in Fig. I, it is evenly and thoroughly coated with a lubricating oil of the desired consistency. A high grade fire test of engine oil is desirable for use with graphite. For some purposes, a heavy oil is used, and for others, a light coating is all that is required. After the sheet is thus coated and crumpled, as seen in Fig. II, it is treated to what I denominate a bath of powdered flake graphite. This step of the process is accomplished either by dredging the surface over with graphite, or by covering the crumpled sheet with a mass of the powder. In practice, I find it desirable to use a tray or pan with flake graphite within the same, and bury the sheet in the graphite, turning the sheet over and over until the same is thoroughly and completely coated. The crumpled surface, with the oil on it, is indicated at 2 in Fig. II, and the crumpled surface coated with the graphite is indicated at 3 in Fig. II. It will be seen by referring to Figs. III and IV, how irregular the surface is made, and how completely it is coated or loaded with the graphite 4. After the crumpled sheet has been thoroughly coated with the graphite or other similar material, or lubricating powder, the same is rolled up into a scroll, as appears in Fig. V, the cross-sectional view appearing in Fig. VI. By thus rolling up the sheet over which the graphite or other lubricating material is distributed, the same is confined by the crumpled sheet and is effectively retained in considerable mass, so that there is about twice the volume of lubricating powder and oil that there is of sheet metal. When the material is thus rolled up in this shape, in order to fully and completely incorporate it together, I place the same in a suitable mold and compress it to about the proportion indicated in Fig. VII, which I denominate semi-compressed straps. An enlarged cross sectional view of the structure of Fig. VII appears in Fig. VIII, giving an idea of the appearance of the material. These semi-compressed straps can be very readily handled without injury, and are very conveniently put into packages and shipped for use. They are handled and put in place as ordinary packing material by being bent around and crammed into place by a suitable calking, tamping or ramming tool when used in journal bearings. The material is shown in a journal bearing 5 in Fig. IX, the same having been forced into position, as indicated. I show it in a stuffing box for a piston rod forming the gasket 6 in Fig. X. The material is especially desirable for such use. It requires no ramming or tamping to form a gasket. Screwing or drawing up the gland is sufficient to conform and compress the same in place.

Great advantage results from rolling the material into a scroll. The material will be quite desirable and efficient if the crumpled sheet be merely compressed, but the whole mass would not be so effectively retained. The metal foil should be of suitable composition for the service intended. For journals, a soft metal only is needed. Where a piston rod or other packing is required, alloys that will resist the heat are made use of. Low steam pressure packing up to 150 lbs. pressure need not differ from the journal packing, and above that pressure, alloys of considerable heat resistance are required. Smooth rolled foil is most desirable for the metal sheet, but metal in approximate sheet form, when crumpled, is quite efficient.

I wish my appended claims to be understood as claiming the broad feature, and also the specific devices, as the state of the art warrants.

Having thus described my invention, what I claim as new and desire to secure by Letters Patent is:

1. A packing material consisting of crumpled sheet metal coated with oil and powdered lubricant formed into a scroll and compacted together, as specified.

2. A packing material consisting of crumpled sheet metal coated with oil and powdered graphite formed into a scroll and compacted together, as specified.

3. A packing material consisting of crumpled sheet metal coated with oil and powdered lubricant folded and compacted together, as specified.

4. A packing material consisting of crumpled sheet metal coated with oil and powdered graphite folded and compacted together, as specified.

5. A packing material consisting of crumpled sheet metal coated with oil and powdered lubricant folded and compacted together.

6. A packing material consisting of crumpled sheet metal coated with oil and powdered graphite folded and compacted together.

7. The process of producing a lubricating material consisting in forming sheets of metal, coating the same with oil, crumpling the sheets, applying powdered lubricant thereon, rolling the same into a scroll, and compacting the mass together, as specified.

8. The process of producing a lubricating material, consisting in forming sheets of metal, coating the same with oil, crumpling the sheets, applying powdered graphite thereon, rolling the same into a scroll, and compacting the mass together, as specified.

9. The process of producing a lubricating material, consisting in forming sheets of metal, coating the same with oil, crumpling the sheets, applying powdered lubricant thereon, and compacting the mass together, as specified.

10. The process of producing a lubricating material, consisting in forming sheets of metal, coating the same with oil, crumpling the sheets, applying powdered graphite thereon, and compacting the mass together, as specified.

11. The process of producing a lubricating material, consisting in providing a crumpled sheet of metal with a coating of oil, applying powdered lubricant thereto and compacting the mass together.

12. The process of producing a lubricating material consisting in providing a crumpled sheet of metal with a coating of oil, applying powdered graphite thereto and compacting the mass together.

In witness whereof, I have hereunto set my hand and seal in the presence of two witnesses.

HENRY P. WHITE. [L. S.]

Witnesses:
L. G. GREENFIELD,
M. P. WOODRUFF.